United States Patent
Wu

(10) Patent No.: US 9,529,432 B2
(45) Date of Patent: Dec. 27, 2016

(54) PROGRESSIVE PAGE TRANSITION FEATURE FOR RENDERING E-BOOKS ON COMPUTING DEVICES

(71) Applicant: RAKUTEN KOBO, INC., Toronto (CA)

(72) Inventor: James Wu, Newmarket (CA)

(73) Assignee: RAKUTEN KOBO, INC., Toronto (CA)

( * ) Notice: Subject to any disclaimer, the term of this patent is extended or adjusted under 35 U.S.C. 154(b) by 0 days.

(21) Appl. No.: 14/579,847

(22) Filed: Dec. 22, 2014

(65) Prior Publication Data

US 2016/0179192 A1    Jun. 23, 2016

(51) Int. Cl.
*G06F 3/01* (2006.01)
*G06F 3/041* (2006.01)
*G06F 3/0488* (2013.01)
*G06F 3/0483* (2013.01)
*G06F 3/0485* (2013.01)

(52) U.S. Cl.
CPC ............. *G06F 3/013* (2013.01); *G06F 3/0416* (2013.01); *G06F 3/0483* (2013.01); *G06F 3/0485* (2013.01); *G06F 3/0488* (2013.01)

(58) Field of Classification Search
CPC .................... G06F 3/013; G06F 3/0416; G06F 2203/04106
See application file for complete search history.

(56) References Cited

U.S. PATENT DOCUMENTS

| | | | |
|---|---|---|---|
| 2012/0256967 A1* | 10/2012 | Baldwin | G06F 3/013 345/684 |
| 2014/0125585 A1* | 5/2014 | Song | G06F 3/013 345/156 |
| 2014/0168054 A1* | 6/2014 | Yang | G06F 3/013 345/156 |
| 2014/0281908 A1* | 9/2014 | Kim | G06F 17/2247 715/234 |

* cited by examiner

*Primary Examiner* — Lixi C Simpson
(74) *Attorney, Agent, or Firm* — Oblon, McClelland, Maier & Neustadt, L.L.P.

(57) ABSTRACT

A reader's position of progression on a current page of an e-book is tracked. The current page is progressively transitioned to next page based on the reader's position on the current page.

19 Claims, 6 Drawing Sheets

Track Reader's Point Of Progression On Current Page 410

Track User's Finger Movement On Display Or Housing Surface 412 | Track User's Gaze Direction 414

Progressively Transition Current Page To Next Page Of Sequence Based On Reader's Point Of Progression 420

Replace Preceding Character Lines With Character Lines Of Next Page In Page Sequence 422

PROGRESSIVE PAGE TRANSITION FEATURE FOR RENDERING E-BOOKS ON COMPUTING DEVICES

TECHNICAL FIELD

Examples described herein relate to an e-reading device, and more specifically, to a progressive page transition feature for rendering e-books on computing devices.

BACKGROUND

An electronic personal display is a mobile electronic device that displays information to a user. While an electronic personal display is generally capable of many of the functions of a personal computer, a user can typically interact directly with an electronic personal display without the use of a keyboard that is separate from or coupled to but distinct from the electronic personal display itself. Some examples of electronic personal displays include mobile digital devices/tablet computers such as (e.g., Apple iPad®, Microsoft® Surface™, Samsung Galaxy Tab® and the like), handheld multimedia smartphones (e.g., Apple iPhone®, Samsung Galaxy S®, and the like), and handheld electronic readers (e.g., Amazon Kindle®, Barnes and Noble Nook®, Kobo Aura HD, and the like).

An electronic reader, also known as an e-reader device, is an electronic personal display that is used for reading electronic books (eBooks), electronic magazines, and other digital content. For example, digital content of an e-book is displayed as alphanumeric characters and/or graphic images on a display of an e-reader such that a user may read the digital content much in the same way as reading the analog content of a printed page in a paper-based book. An e-reader device provides a convenient format to store, transport, and view a large collection of digital content that would otherwise potentially take up a large volume of space in traditional paper format.

In some instances, e-reader devices are purpose-built devices designed to perform especially well at displaying readable content. For example, a purpose built e-reader device includes a display that reduces glare, performs well in highly lit conditions, and/or mimics the look of text on actual paper. While such purpose built e-reader devices excel at displaying content for a user to read, they can also perform other functions, such as displaying images, emitting audio, recording audio, and web surfing, among others.

There also exist numerous kinds of consumer devices that can receive services and resources from a network service. Such devices can operate applications or provide other functionality that links the device to a particular account of a specific service. For example, e-reader devices typically link to an online bookstore, and media playback devices often include applications which enable the user to access an online media library. In this context, the user accounts can enable the user to receive the full benefit and functionality of the device.

DETAILED DESCRIPTION

Figure 1:
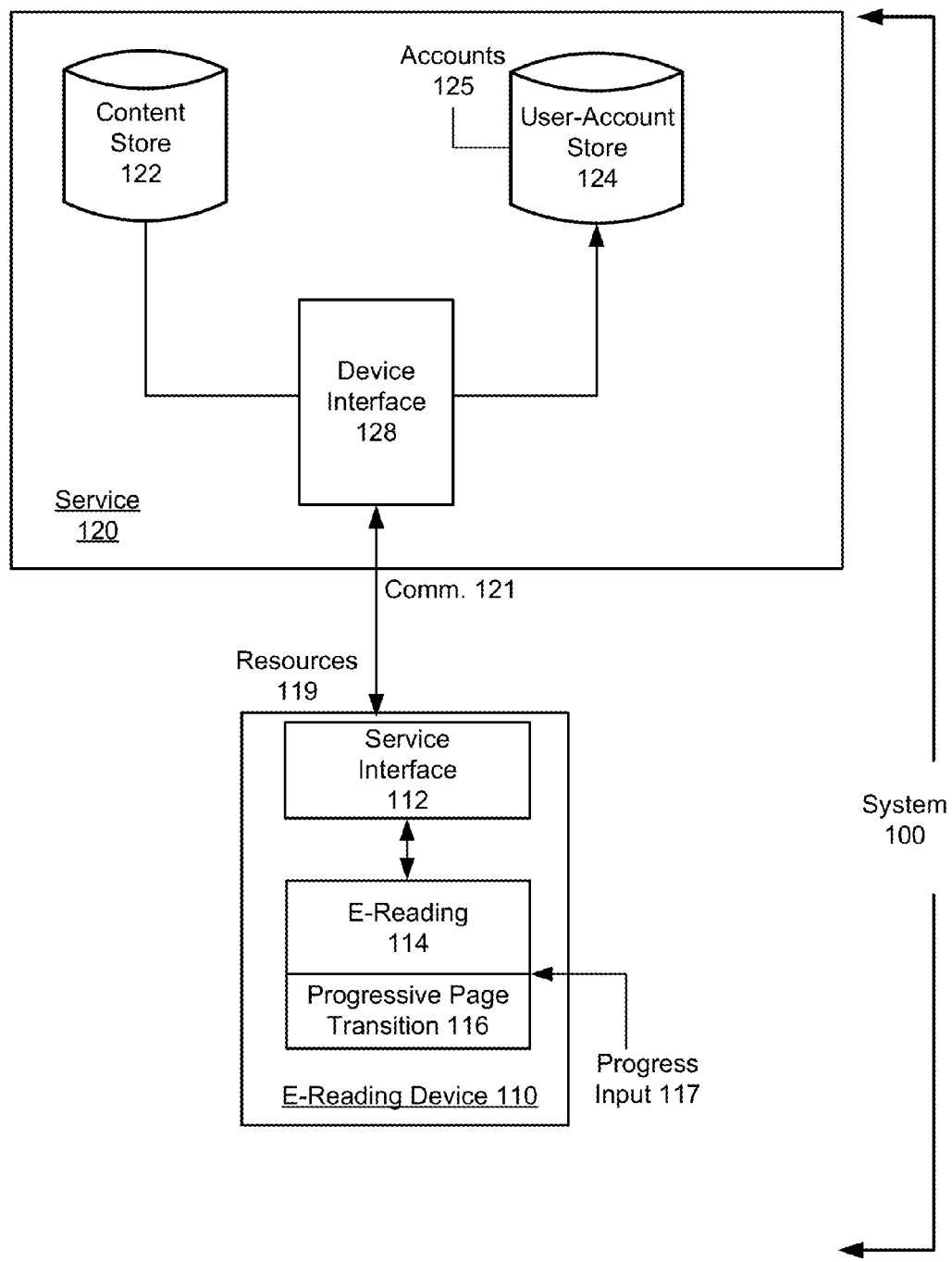
FIG. 1 illustrates a system that utilizes an e-reading device for implementing progressive page transitions, according to an embodiment.

Described embodiments provide a computing device that is operable to implement a progressive page transition (or page turn) feature. When implementing a progressive page transition feature, a computing device can render an e-book so that page turns are implemented through a progressive update that results in portions of the page being individually replaced, rather than the page as a whole being updated at one time.

Described embodiments recognize that e-book are formatted or structured to provide a collection of sequenced pages, with individual pages of the e-book providing multiple character lines that are arranged to reflect a direction of progression. The direction of the character lines, as well as the relative direction of progression is determined by the language of the writing. For example, English text includes horizontal character lines and the direction of progression is downward, while some Japanese and Asian writings include character lines that are vertical, with the direction of progression being right-to-left. Thus, the reading speed of the user can correlate to advancement of the reader's progression along the direction of progression. Moreover, described embodiments recognize that since the user's direction of progression typically remains the same (e.g., downward in English text), the read portions of the page can, at any particular instance, be independently refreshed with content from the next page. Such partial refresh can be repeated in progression as the user completes the page, so that all of the character lines of the page are eventually replaced. When the user completes the page view, the user can simply return his gaze to the top of the page view in order to view content from the next page.

According to some embodiments, a reader's position of progression on a current page of an e-book is tracked. A current page can be progressively transitioned to next page based on the reader's position on the current page.

Furthermore, some examples described herein promote page transitioning activities on devices that otherwise have inherent limitations with respect to the user-experience of page transitions. For example, many e-reading devices which use electronic paper displays (e.g., electrophoretic displays or EPD displays) also include a comparatively slow display screen refresh rate, and this refresh rate can cause a visual disruption to the reader. This disruption can be more pronounced in certain use cases such as when the user is speed reading. For example, on many devices that use EPD screens, the time it takes for the computing device to redraw the screen with new content (e.g., the "next page") after a corresponding user input (e.g., screen tap marking page turn event) can sometimes generate a noticeable flicker. This flicker can be a-limiting factor for those who want to read fast.

According to one aspect, a computing device is configured to progressively and repeatedly replace individually text lines on a page with corresponding text lines from a next page. A computing device can make a determination that the user's point of progress in reading the page has passed a threshold, and one or more text lines which precede the point of progress are then selected for replacement. For example, in one implementation, once the user completes page n, a substantial portion (if not the entirety) of page n+1 is already pre-drawn on the screen and the user simply cycles to the top of the screen to keep reading continuously, without need for the computing device to perform a global page refresh.

In the context of e-reading, examples recognize that the more a computing device can mimic a physical, real-world reading experience, the better is the user's experience in utilizing the computing device. For speed reading, however, conventional devices limit the user experience. For example, e-reading devices that employ EPD screens (e.g., e-readers) visually disrupt the reading experience in a manner that affects speed reading. Additionally, e-reading devices that use comparatively fast refresh hardware and functionality (e.g., LC screens) fail to mimic a physical or real-world speed reading experience. For example, some conventional speed reading techniques include continuously scrolling text lines while the user maintains their focus on a fixed location on the screen. This is a change to the normal reading process of the user, because under such approaches, the user is required to direct his gaze at one location, rather than tracking the gaze along the direction of progression (e.g., downward).

In contrast to some conventional approaches, described embodiments enable progressive page transitions in which page content is progressively updated with content from a next page. The progressive page transition can result in the computing device updating select portions (e.g., lines of text) of a page with corresponding portions from a subsequent page. The update can be performed repeatedly while the user views a current page, even when the user's time on the page is limited (e.g., when the user is speed reading).

In contrast to such conventional approaches, described embodiments enable the content of a page to be progressively updated while the user follows a natural reading action in which the user gaze follows the direction of progression until the page view is complete. Additionally, with regard to some displays such as EPD displays, global page refresh events can be avoided in lieu of selectively updating portions of the display screen corresponding to lines of read text. Thus, among other benefits, any visual disturbance that can be attributed to the display screen being updated is limited to areas of the display that are not in the user's gaze.

According to some embodiments, a computing device includes a housing, a processor, a display assembly which includes a display screen provided with the housing, and a set of sensors that are arranged to detect user contact with a surface of at least one of the display screen or housing. The processor operates to render individual pages of an e-book in accordance with a sequence of the pages. Each page of the e-book may include multiple lines of characters that are arranged to have a direction of progression. When a current page is rendered from the e-book, the computing device detects a user's movement of an object on the surface in the direction of progression. At each of multiple instances during when the user's movement of the object is detected, a position of the object is correlated with a set of character lines of the current page so as to indicate a position of progression. Additionally, during when the user's movement of the object is detected on the current page, at least one of the multiple lines of characters on the current page may be replaced with a set of character lines from a next page that follows the current page in the sequence. The replaced line of characters may correspond to at least one of the multiple lines of characters preceding, relative to the direction of progression, the set of character lines that indicate the position of progression.

An "e-reading device" can refer to any computing device that can display or otherwise render an e-book. By way of example, an e-reading device can include a mobile computing device on which an e-reading application can be executed to render content that includes e-books (e.g., comic books, magazines etc.). Such mobile computing devices can include, for example, a mufti-functional computing device for cellular telephony/messaging (e.g., feature phone or smart phone), a tablet device, an ultramobile computing device, or a wearable computing device with a form factor of a wearable accessory device (e.g., smart watch or bracelet, glass ware integrated with computing device, etc.). As another example, an e-reading device can include an e-reader device, such as a purpose-built device that is optimized for e-reading experience (e.g., with E-ink displays etc.).

One or more embodiments described herein provide that methods, techniques and actions performed by a computing device are performed programmatically, or as a computer-implemented method. Programmatically means through the use of code, or computer-executable instructions. A programmatically performed step may or may not be automatic.

One or more embodiments described herein may be implemented using programmatic modules or components. A programmatic module or component may include a program, a subroutine, a portion of a program, or a software or a hardware component capable of performing one or more stated tasks or functions. As used herein, a module or component can exist on a hardware component independently of other modules or components. Alternatively, a module or component can be a shared element or process of other modules, programs or machines.

Furthermore, one or more embodiments described herein may be implemented through instructions that are executable by one or more processors. These instructions may be carried on a computer-readable medium. Machines shown or described with figures below provide examples of processing resources and computer-readable mediums on which instructions for implementing embodiments of the invention can be carried and/or executed. In particular, the numerous machines shown with embodiments of the invention include processor(s) and various forms of memory for holding data and instructions. Examples of computer-readable mediums include permanent memory storage devices, such as hard drives on personal computers or servers. Other examples of computer storage mediums include portable storage units, such as CD or DVD units, flash or solid state memory (such as carried on many cell phones and consumer electronic devices) and magnetic memory. Computers, terminals, network enabled devices (e.g., mobile devices such as cell phones) are all examples of machines and devices that utilize processors, memory, and instructions stored on computer-readable mediums. Additionally, embodiments may be implemented in the form of computer-programs, or a computer usable carrier medium capable of carrying such a program.

System Description

FIG. 1 illustrates a system that utilizes an e-reading device for implementing progressive page transitions, according to an embodiment. In an example of FIG. 1, system 100 includes a network service 120 and a mobile computing device or other personal display device which operates as an e-reading device 110. The network service 120 can include multiple servers and other computing resources that provide various services in connection with one or more applications that are installed on the e-reading device 110. By way of example, in one implementation, the network service 120 can provide e-book services which communicate with corresponding e-reading functionality provided on the e-reading device 110. The e-book services can enable e-books (including electronic magazines and other periodicals) to be downloaded or archived from e-reading device 110. The network service 120 can also provide other forms of content for download or streaming, such as videos or music. In this way, the network service 120 can provide various other content services, including content rendering services (e.g., streaming media) or other network-application environments or services.

The e-reading device 110 can be implemented on any electronic personal display device on which applications and application resources (e.g., e-books, media files, and documents) can be rendered and consumed. For example, the e-reading device 110 can correspond to a tablet or a telephony/messaging device (e.g., smart phone). In one implementation, for example, e-reading device 110 can correspond to a mobile computing device (e.g., tablet) that runs an e-reading application to link the device to the network service 120. The e-reading device 110 can execute the application to enable e-books provided through the service to be viewed and consumed. Still further, by way of example, the e-reading device 110 can be equipped with hardware and software to optimize certain application activities, such as rendering of electronic content (e.g., e-books, including electronic magazines and other periodicals). For example, the e-reading device 110 can have a tablet like form factor, although variations are possible. In some cases, the e-reading device 110 can also have an E-ink display with touch or contact sensors.

In additional detail, the network service 120 can include a device interface 128, a resource store 122 and a user account store 124. The user account store 124 can associate the e-reading device 110 with a user and with an account 125. The account 125 can also be associated with one or more application resources (e.g., content item such as an e-books), which can be stored in the resource store 122. As described further, the user account store 124 can retain metadata for individual accounts 125 to identify resources that have been purchased or made available for consumption for a given account. The e-reading device 110 may be associated with the user account 125, and multiple devices may be associated with the same account. As described in greater detail below, the e-reading device 110 can store resources (e.g., e-books) that are purchased or otherwise made available to the user of the e-reading device 110, as well as to archive e-books and other digital content items that have been purchased for the user account 125, but are not stored on the particular computing device.

The e-reading device 110 can include a service interface 112 and an e-reading component 114. The e-reading device 110 can execute the service interface 112 to receive resources 119 and data from the network service 120. The service interface 112 can, for example, send one or more communications 121 to the network service 120, with each communication including an identifier for the user and/or user account. The service interface 112 can interface with the network service 120 to receive resources such as applications and content items (e.g., e-books, music files, etc.) from the network service 120. Optionally, the e-reading device 110 can communicate with multiple services in order to receive resources 119. The resources 119 can be received in response to user-input or action (e.g., purchasing input), or through automated predetermined actions (e.g., automatic download of new issue of periodical based on user subscription data maintained with the user account).

The e-reading device 110 can execute the e-reading component 114 to enable e-reading activities. In one aspect, the e-reading component 114 can render paginated content from e-books (e.g., electronically formatted literary works). In particular, the e-books can be structured into pages that follow a sequence, with each page including multiple lines of characters. The lines of characters provide the text content of individual pages, and collectively, the pages provide the text content of the e-book. Depending on implementation, the pagination of an e-book can be static or dynamic. When the structure of an e-book provides for static pagination, the format and structure of the e-book is fixed and predetermined, so that each page appears to include the same content from device to device. However, many e-books, such as literary works which are primarily text-based (e.g., novels), can be paginated on-the-fly by the e-reading component 114, based on, for example, a display size of the device and/or font size settings of the user or device. In such implementations, an e-book can be structured into a collection of sequenced pages, but the pagination can change with respect to, for example, the reader changing settings (e.g., font size or type) or to cessation of the reading session.

According to some embodiments, the e-reading component 114 includes, or is provided with, a progress page transition feature ("PPTF") 116. Depending on implementation, the PPTF 116 can be provided as either an integrated functional feature of the e-reading component 114, as a plug-in component, or as a stand-alone functional component which operates in conjunction with the e-reading component 114 to render individual pages of an e-book. The PPTF 116 operates to (i) determine a progress point of the user reading a given page, (ii) select a set of one or more character lines that precede the progress point, and (iii) replace the selected set of character lines with a corresponding set of character lines from a next page of a sequence of the e-book.

In one aspect, the PPTF 116 is responsive to progress input 117 from the user. The progress input 117 can be provided with a user directed object (e.g., finger or stylus) interacting with a sensor-based input surface of the e-reading device 110. By way of example, the sensor-based input can be provided by a touch or contact-sensitive display surface, or alternatively by a sensor-integrated surface of the e-reading device housing. In one implementation, the progress input 117 can be entered by the user to provide feedback for the e-reading device 110 in determining the progress point of the user when reading a particular page. For example, the progress input 117 can be dimensionally (e.g., along one axis of a rendered page) or positionally (e.g., along two axes of a rendered page) correlated to a particular line of characters which represent the most-recently read line of text on the page. At a particular sample point, the PPTF 116 can select character lines which precede the progress point and which provide content from the current page. The PPTF 116 can then update a corresponding region or portion of the display screen with character lines from a next page in the sequenced collection of pages for the e-book. For example, the PPTF 116 can number the character lines on a given page, and then replace character lines of the current page with same numbered character lines of the next page.

In a variation, the PPTF 116 can be incorporated in context of eye tracking (or gaze aware) functionality provided on the e-reading device 110. The PPTF 116 can respond to directional and position input that corresponds to the reader's eye ball (or gaze) orientation with respect to the display screen of the e-reading device 110. The user's gaze can then replace the need for using a physical object such as a stylus or finger.

Hardware Description

Figure 2:
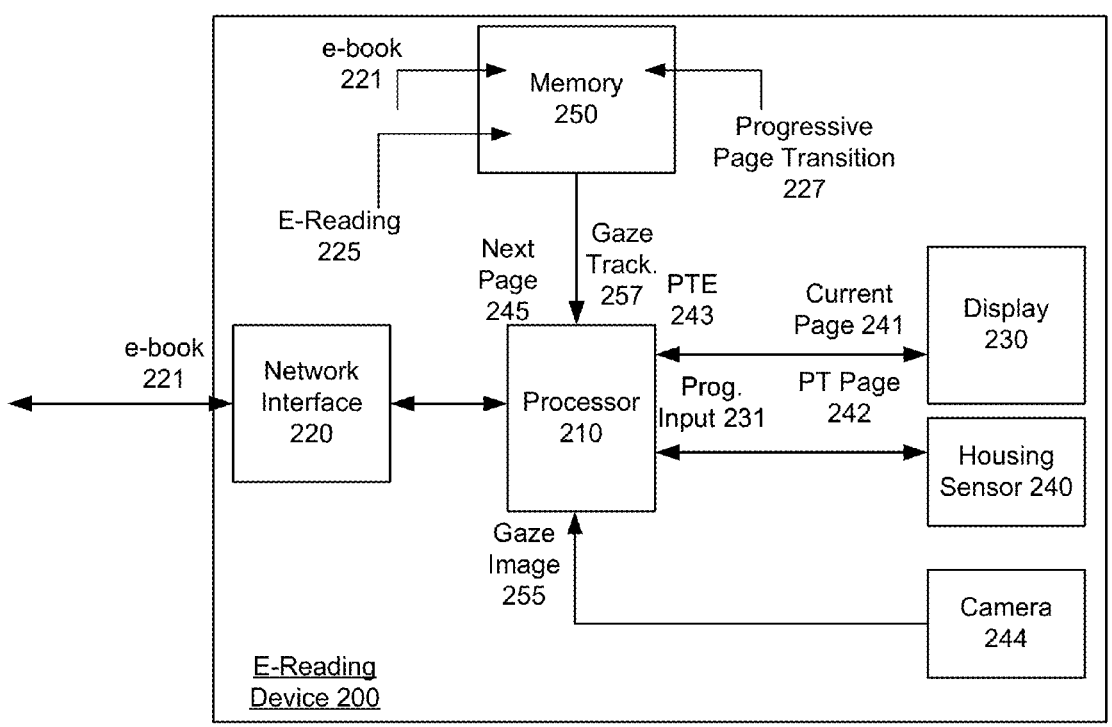
FIG. 2 illustrates an example of an e-reading device for use with one or more embodiments described herein.

FIG. 2 illustrates an example of an e-reading device for use with one or more embodiments described herein. In an example of FIG. 2, an e-reading device 200 can correspond to, for example, a mobile computing device such as shown by an example of FIG. 1.

With reference to FIG. 2, e-reading device 200 includes a processor 210, a network interface 220, a display 230, one or more input mechanisms 240, a camera 244, and a memory 250. The processor 210 can implement functionality using instructions stored in the memory 250. Additionally, in some implementations, the processor 210 utilizes the network interface 220 to communicate with the network service 120 (see FIG. 1). More specifically, the e-reading device 200 can access the network service 120 to receive various kinds of resources (e.g., digital content items such as e-books, configuration files, account information), as well as to provide information (e.g., user account information, service requests etc.). For example, e-reading device 200 can receive application resources, such as content files (e.g., e-books 221) that the user elects to purchase or otherwise download from the network service 120. The application resources that are downloaded onto the e-reading device 200 can be stored in the memory 250.

In some implementations, the display 230 can correspond to, for example, a liquid crystal display (LCD) or light emitting diode (LED) display that illuminates in order to provide content generated from processor 210. In some variations, the display 230 can correspond to an electronic paper type display, which mimics conventional paper in the manner in which they display content. Examples of such display technologies include electrophoretic displays ("EPD"), electrowetting displays, and electrofluidic displays.

In some implementations, the display 230 can be touch-sensitive. For example, the display 230 can be integrated with a sensor layer that is comprised of capacitive touch sensors which trigger with contact to human skin and other surfaces which carry capacitance. Alternatively, the display 230 can include alternative sensor layers, such as resistive sensors which can detect applied pressure from, for example, a human finger or stylus.

The processor 210 can receive input from various sources, including from input mechanisms (e.g., buttons or switches, microphone, keyboard), the display 230 (e.g., soft buttons or virtual keyboard) or other input mechanisms (accessory devices). In one implementation, the processor 210 can process multi-touch input detected by the sensor layer provided on the display 230.

In one aspect, memory 250 stores instructions 225 ("e-reading instructions 225") for operating an e-reading application (e.g., see e-reading component 114 in FIG. 1). The memory 250 can also store instructions for implementing the PPTF 116 ("progressive page transition instructions 227"). The progressive page transition instructions 227 can be executed by the processor with the e-reading instructions 225. When e-reading instructions 225 are executed, the processor 210 can render content on display 230. The content can include text content, provided in the form of lines of characters, aligned in a direction of convention based on the native language used. For example, in English, text content can be arranged as rows of characters, with the progression of the rows corresponding to a vertical and downward direction.

When processor 210 executes the e-reading instructions 225, the processor can implement a first mode in which page transitions occur globally, so that the entire page is refreshed at one time. In this mode, the processor 210 can generate a page view 241, and a corresponding page transition event can be provided by, for example, user input to transition to the next page of the e-book. In the mode of operation, the page transition event 243 results in an updated or next page 245 being rendered on display 230.

When the processor 210 executes the progressive page transition instructions 227, an alternative mode can be implemented in which the processor 210 does not implement a global refresh on the entire contents of the page. Rather, the processor 210 localizes content refresh to specific segments of the current page 241 where lines of characters are identified for replacement by corresponding character lines from a next page. The processor 210 can render partially transitioned pages 241, which include content from the current page 241 and the next page. As the user progresses towards completing the page, the partially transitioned page 241 can be updated so that more character lines of the next page are displayed. Eventually, the character lines of each page are displayed, but not at once.

In more detail, one implementation provides for the processor 210 to receive progress input 231 from the user interacting with the e-reading device 200 when viewing a current page 241. The progress input 231 can be signaled by the user moving a finger or other object along a contact sensitive surface 240 of the e-reading device 200. For example, it is typical of speed reading users to track their vertical progression down a page of text using a finger or other object that moves alongside the page being read.

With progression input 231, the processor 210 can execute the progressive page transition instructions 227 to select individual lines of characters of the current page 241 for replacement. The progressive page transition instructions 227 can specify, for example, (i) instructions to detect the point of progression by the user based on progress input 231, (ii) rules for determining which lines of characters to select for replacement based on the point of progression, and specifically lines of characters that proceed the point of progression but which have not previously been replaced, (iii) identification of lines of characters on the next page which correlate with lines of characters on the current page (e.g., replace the fifth, sixth and seventh lines of characters on the current page with the fifth, sixth and seventh lines of characters of the next page); and (iv) logic for controlling the display 230 for implementing a partial update or refresh to replace select lines of characters in the current page with correlated lines of characters from the next page.

In implementations in which the display 230 is an electronic paper or EPD type display, the processor 210 can signal a partial refresh by flicking pixels at the regions of the selected character lines. The refresh can be implemented by the processor 210 signaling new character lines from the next page in the sequence. The character lines from the next page can be correlative to those selected for replacement at the particular instance for the current page. In this way, the character lines that form the current page can be progressively replaced, either individually or in sets, until all of the character lines of the page are replaced.

In implementations in which the display assembly has comparatively slow refresh-rate, the e-reading device 200 can implement page transitions while avoiding a global page view refresh. Among other benefits, such e-reading devices 200 can implement page transitions without incurring flickering or other unwanted affects which may result from a global page refresh operation.

More generally, described embodiments implement a partial refresh or update to portions of the current page which the user has already read. As the assumption can be made that the reader will continue to progress towards the bottom of the page (or along the direction of progress), the e-reading device 200 can avoid or mitigate any potential visual disruption on a page that is being read by limiting refresh operations to select character lines which the user has already read.

In some variations, the camera 244 can be used in combination with gaze tracking logic to track the user's eyeball or gaze direction. In one embodiment, camera 244 is forward facing to capture image data corresponding to the users face, and more specifically, the user's eyes ("gaze image 255"). The processor 210 can retrieve instructions for implementing gaze tracking logic ("gaze tracking instructions 257") in order to make determination that correspond to progress input 131. For example, the user's gaze direction can be interpreted to a position on a displayed page corresponding to a line or set of lines (e.g., region of 3-5 lines). With the user's gaze direction being translated to progress input 131, the processor 210 processor 210 can execute the progressive page transition instructions 227 in order to implement progressive page transitions.

Device System

Figure 3A:
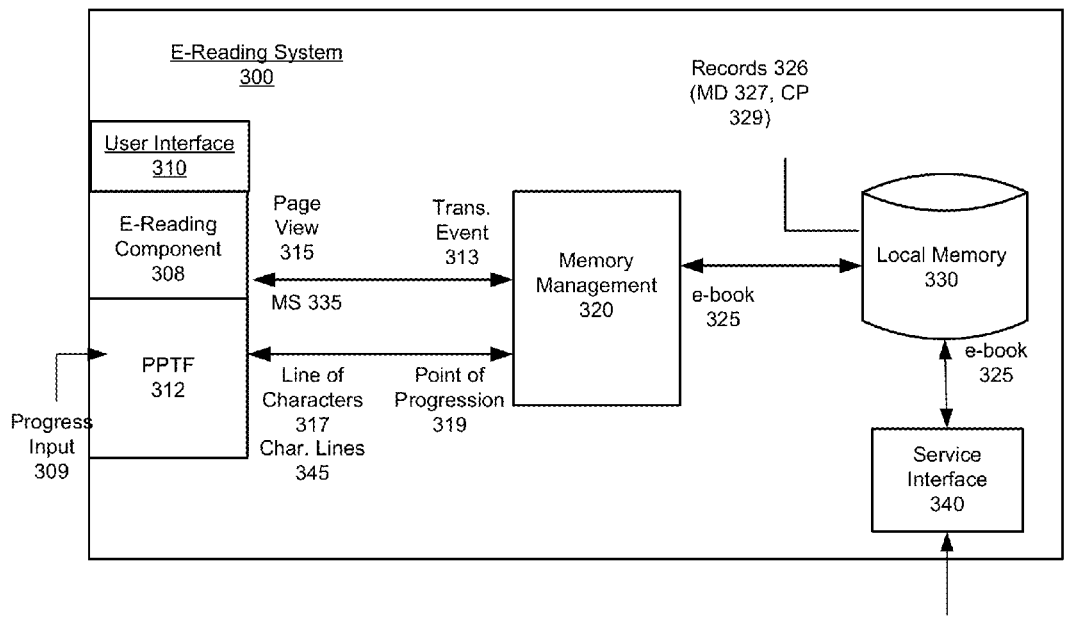
FIG. 3A illustrates an e-reading system for implementing a progressive page transition mode, according to an embodiment.

FIG. 3A illustrates an e-reading system for implementing a progressive page transition feature, according to an embodiment. A system 300 of FIG. 3A can be implemented using an e-reading device such as described with an example of FIG. 1 or FIG. 2. In more detail, system 300 implements programmatic components for communicating with one or more network service (such as network service 120, shown in FIG. 1), as well as for enabling functionality for viewing and accessing content items (e.g., e-books) utilized by an account associated with the e-reading device 110 (see FIG. 1). In some embodiments, the system 300 can be implemented as an application that runs on an e-reading device, such as shown with examples of FIG. 1 or FIG. 2. In variations, the system 300 can be implemented as part of the operating system for the e-reading device.

In an example of FIG. 3A, system 300 includes a user interface 310, a memory management module 320, a local memory 330, and a service interface 340. Some or all of the programmatic components shown with the computing system 300 can be provided in part as operating system-level components. Alternatively, the programmatic components shown with the computing system 300 can be provided as part of an application or application platform that runs on, for example, the e-reading device 110 (see FIG. 1). For example, the user can download an application onto the device that is operated as the e-reading device 110, in order to obtain functionality such as described with an example of FIG. 3A, as well as to communicate with the network service 120. Alternatively, an application can be embedded or otherwise preinstalled with other programmatic elements for providing functionality such as described with system 300.

The service interface 340 includes application logic which enables the e-reading device 110 to use, for example, a wireless Internet connection, to connect to the network service 120 (see FIG. 1). In connecting with the service, the service interface 340 can transmit data that enables the network service 120 to identify the e-reading device 110 on which system 300 is implemented, so that the network service 120 can determine the account that is associated with the particular e-reading device. The service interface 340 can be used to retrieve e-books 325 from the network service 120. For example, in identifying the e-reading device 110 of system 300 to the network service 120, the network service may be able to procure payment information (e.g., stored credit card information) that can be used to charge the user's account when the user purchases a new e-book from the service. Each e-book can correspond to a literary work having a pagination format, such as provided by literary works (e.g., novels). Other e-books can have pagination which is statically predetermined, such as in the case of some periodicals (e.g., magazines, comic books, journals, etc.). Optionally, some e-books may have chapter designations, as well as content that corresponds to graphics or images (e.g., such as in the case of magazines or comic books). Individual e-books 325 also include metadata 327, such as imagery provided as a cover for the e-book when the e-book is marketed (e.g. similar to the manner in which a conventional hardbound book would be marketed in a retail store). In one implementation, the network service 120 can retrieve or otherwise identify the imagery and other metadata 327 of individual e-books from publisher sources.

In identifying the e-reading device of system 300, the network service 120 can identify what e-books belong to the account associated with the particular device. The e-books that are transmitted to the e-reading device of system 300 can include, for example, those e-books that are purchased from the device, or those e-books that the user requested to download. In variations, e-books can be automatically downloaded to the device in response to occurrence of certain conditions. For example, the user can purchase an e-book on another device, and then subsequently connect to the network service 120 via the e-reading device 110 to automatically receive their previously purchased e-book. As another example, network service 120 can be configured to push e-books to the e-reading device 110 of system 300, based on, for example, user account settings, subscription plans and rules, and various other business logic considerations.

Additionally, the service interface 340 can include processes for automatically receiving updates from a network service 120. The update can include programmatic updates, including updates to software components on the e-reading device 110, as well as updates to lists, download of e-books that the user may have purchased on another device of the same account, recommendations from the network as to what a given user may want to purchase or view, and/or various other data that can be either generally provided to the user of the network service or specifically provided for to the particular account or user.

According to some embodiments, the local memory 330 stores each e-book as a record 326 that includes metadata 327 and content 329 (e.g., page content). The memory management module 320 can include distributed memory resources, such as cache resources utilized by the e-reading component 308. The memory management module 320 can retrieve portions of the content 329 for individual e-books for purpose of rendering e-books via the user interface 310. Additionally, the memory management module 320 can retrieve metadata 327 to render metadata content (e.g., representations of e-books or lists of e-books) with the user interface 310.

In an example of FIG. 3A, the user interface 310 of e-book system 300 includes an e-reading component 308 and a progressive page transition feature ("PPTF") 312. The e-reading component 308 can include functionality to (i) render page views 315 from a particular e-book, and (ii) detect page transition events 313. Each page view 315 can include content for at least one page. In one mode of operation, the page views 315 provide that an entire page is rendered and updated at one time based on the content portion 329 of the e-book being read (e.g., opened or rendered). For example, the e-reading component 308 can display a page view 315 from an e-book corresponding to a novel or periodical, and the page view may be represented as a page from the book or novel. The page event 313 can correspond to, for example, the detection of an input corresponding to a page turn, a chapter turn, or a clustered page turn.

In more detail, the e-reading device of system 300 enables the user to specify settings or other input for purpose of implementing a mode switch 335 when performing e-reading activity using the e-reading component 308. As described with other examples, the mode switch 335 can switch the modal operation of the device of system 300 from a default page transition mode to a progressive page transition mode. In the default page transition mode, the entire page is rendered and updated at one time. In the progressive page transition mode, the page is rendered in sections or portions, coinciding with character lines that form the content of the page. The mode switch 335 can be triggered by user input, such as provided through a user-specified setting or by user interaction with an input interface.

When the mode switch 335 results in the progressive page transition mode, the PPTF 312 processes progress input 309 from a user interaction with the device of the e-reading system 300. The user interaction for generating progress input 309 can, for example, correspond to the user dragging a finger or object along a contact-sensitive surface of the e-reading device in connection with the user reading from the current page view 315. Alternatively, the user interaction for generating progress input 398 can be in the form of the user directing their gaze onto the display screen of the device, with gaze tracking logic (and camera) translating gaze direction to position input repeatedly while the user reads content from the e-book. In these variations, the user interaction can reflect a point of progression 319 in a current page being read by the user. The point of progression 319 can be used to select lines of characters 317 from a portion of the current page view 315 which precedes the point of progression. The selection of the lines of characters 317 can be correlated to character lines 345 of the next page of the e-book. The PPTF 312 can retrieve the character lines 345 of the next page from, for example, a cache resource provided with the memory management 320.

Figure 3B:
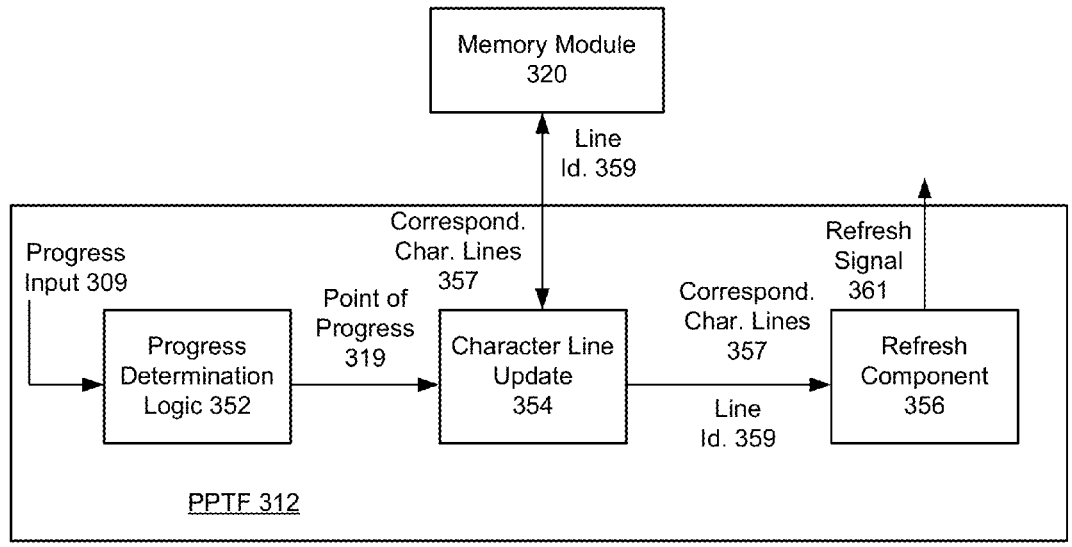
FIG. 3B illustrates an example implementation of the progressive page transition feature described with an example of FIG. 3A.

FIG. 3B illustrates an example implementation of the progressive page transition feature 312 described with an example of FIG. 3A. In more detail, the PPTF 312 includes progress determination logic 352, character line update 354, and refresh component 356. The determination logic 352 determines the current point of progression 319 (see FIG. 3A) based on, for example, progress input 309. For example, the progress determination logic 352 can determine the vertical and/or horizontal position of a user's finger or object on a touch-sensitive surface of the e-reading device. Alternatively, the progress determination logic 352 can determine the vertical and/or horizontal positions on the displayed page which are deemed to be in line with the user's gaze at a given instance. In either variation, the progress determination logic 352 performs the determination repeatedly (or continuously) in order to track the user's progress as the user reads. In this way, the progress determination logic 352 can map the progress input 309 to the current page in order to determine, at a given instant of time, the point of progression 319, which reflects the furthest point the user has read to on the current page.

According to one aspect, the user may be prompted or encouraged to move his or her finger on the display screen to track the line that the user is reading. This motion can be tracked internally by processing resources of the e-reading device as an estimation of the point of progression 319. In variations, the point of progression 319 can be predicted based on timing. For example, the user can be observed to take a certain amount of time to read a complete page, and the user's point of progression 319 can be correlated to passage of time as compared to the estimated time needed for the user to complete reading of the page.

The character line update 354 can select lines of characters based on the point of progression 319 on the current page 315. In particular, the character line update 354 can select character lines which precede the point of progression 319 on the current page. The character line update 354 can specify character lines using a character line identifier 359. The character line identifier can correspond to, for example, (i) a coordinate or area designation of a rendered page where the selected character lines (and no other character lines) appear, or (ii) a character line number (e.g., "page 4, line 3-5"). Once the character lines on the current page are selected, the selected character lines, as identified by character line identifier 359, are marked for refresh.

Additionally, the character line update 354 can select corresponding lines of characters 357 from the next page to replace the character lines of the current page which are marked for refresh. The character lines 357 from the next page can be retrieved from the memory module 320. The selection of the character lines 357 from the next page can be based on the identifiers 359 of the character lines of the current page which have been marked for refresh at a given instant. Thus, the character lines of the next page which are to provide the replacement character lines can be identified to have the same line number, or alternatively, be provided in the same page region (e.g., as identified by Cartesian coordinates) as those lines marked for refresh on the current page.

The refresh component 356 refreshes the character lines marked for refresh (e.g., as identified by the line identifiers 359) using the corresponding character lines 357 from the next page (as determined from the character line identifiers). A refresh signal 361 from the refresh component 360 can be signaled to an interface for a display assembly 230 (see FIG. 2). The refresh signal 361 can include, for example, pixel values which include a region of the display area where the character lines of the line identifier 359 are provided. The refresh component 356 can also include (or write), with the refresh signal 361, pixel values that result in the corresponding character lines 357 of the next page being drawn. For example, in an implementation in which an EPD display is used, the refresh component 356 can first signal the pixels coinciding with the selected character lines to be blank, then write content to those pixels corresponding to the character lines 357 of the next page. Once a character line is refreshed, it is no longer marked for refresh, so it will not be updated until the other character lines on the current page are all refreshed. In this way, the character lines of the page are refreshed progressively, such as individually or in sets. But when the mode implemented is for progressive page transition, the current page is not globally refreshed, as done in conventional approaches.

Methodology

Figure 4:
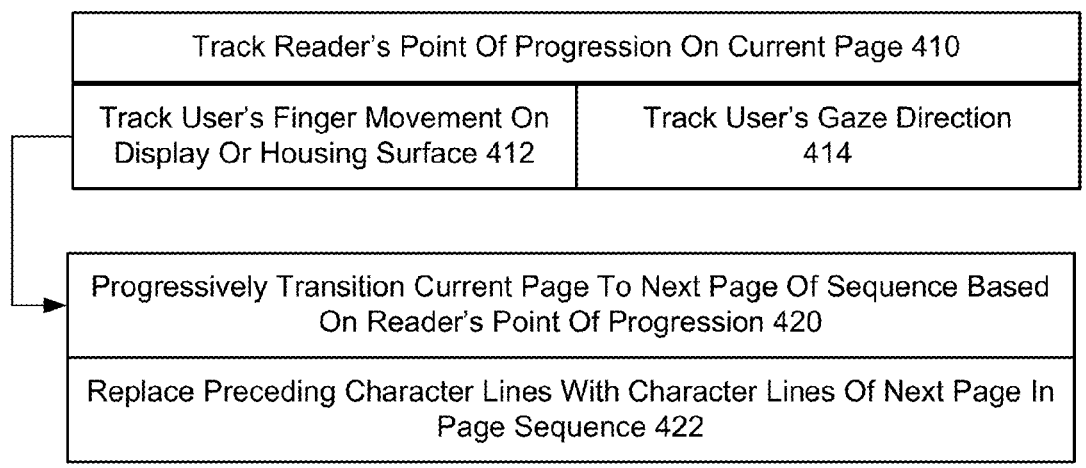
FIG. 4 illustrates a method for progressively transitioning pages of an e-book, according to an embodiment.

FIG. 4 illustrates a method for progressively transitioning pages of an e-book, according to an embodiment. In describing an example method of FIG. 4, reference may be made to elements of a system of FIG. 1, an e-reading device of FIG. 2, and/or an e-reading system of FIG. 3, for purpose of illustrating suitable components for performing a step or sub-step being described.

With reference to FIG. 4, the user's point of progression on a current page is tracked based on user activity or action (410). The point of progression can correspond to, for example, the latest line, paragraph or word which the user has read on a particular page. In one implementation, the progression can be tracked by user action or input, provided contemporaneously with the user viewing a page of an e-book. The user action or input can include the finger moving his finger or other object (e.g., stylus) along a contact-sensitive surface (e.g., touch screen of display, housing surface) of the e-reading device (412). Alternatively, the user input can correspond to the user's gaze moving in a direction of progress, indicating the progression of the user in reading a page from the e-book (414). In one implementation, the movement of the finger/object/gaze can be positioned on, adjacent to or otherwise near the display screen where the text content from the rendering of the current page. In variations, the contact surface can be positioned away from the display screen. The e-reading device 110, 200 can map the position information determined from the user moving his finger or object to coordinates of a current page rendered on the display screen. From the mapping, the user's point of progression can be determined. For example, the point of progression can correspond to the line number identified by the vertical dimension on the current page which maps to the most current location of the user's finger or object movement on the contact surface.

According to an embodiment, the e-reading device 110, 200 progressively transitions the current page to the next page based on the determined point of progression (420). The progressive page transition can occur as the user finger or object moves on the contact-sensitive surface in the progress direction of the text. The point of progression can be determined repeatedly or continuously as, for example, the user's finger moves down the display or contact surface. The e-reading device 110, 200 can determine the point of progression at multiple instances when the finger is moving on the surface.

At each determined point of progression, one or more character lines are replaced with corresponding character lines of a next page in the sequence (422). At each instances when the point of progression is determined, a set of character lines are selected from the current page based on the point of progression. The character lines can be selected based on criteria that includes (i) the character line precedes the point of progression, and (ii) the character line has not been previously selected and replaced. In some variations, the point of progression must exceed a threshold value before a character line is selected from the current page.

An identifier of the selected character lines (e.g., line number) can be used to select corresponding character lines from a next page. In this way, the selected character lines can be updated by the corresponding character lines of the next page. For example, the refresh component 356 can signal refresh signal 361, which can update or otherwise write content to the display screen which replaces selected character lines of the current page with the character lines of the next page.

EXAMPLES

FIG. 5A through FIG. 5D illustrate an example of an e-reading device which transitions pages based on the progression of a user reading a page, according to an embodiment. In FIG. 5A through FIG. 5D, an e-reading device 500 includes a display screen 510 on which a page 512 from an e-book is rendered. The page 512 can include lines of characters 522. The lines of characters 522 can include an orientation (including progress direction) that is determined from the native language of the text content. For example, in English language, the character lines can be structured to extend horizontally on the page 512. As another example, other native languages (e.g., Japanese writings, or select Chinese writings), the character lines 522 can be provided vertically.

Figure 5A:
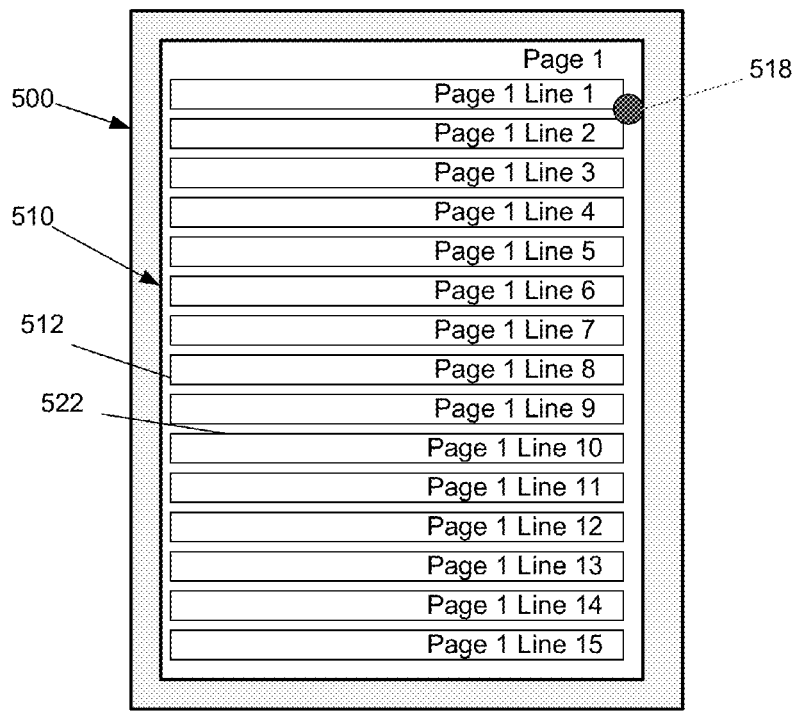
FIG. 5A through FIG. 5D illustrate an example of an e-reading device which transitions pages based on the progression of a user reading a page, according to an embodiment.

When the user starts reading a page, a point of progress 518 is determined to reflect the user's reading position as the user reads to the bottom of the current page. The point of progression 518 can be determined from the movement of the user's finger or object on, for example, the display screen 510. In FIG. 5A, the user initiates reading of a page. In the example provided, as the point of progression 518 has not exceeded a threshold, the character lines 522 of the page 512 remain unchanged.

Figure 5B:
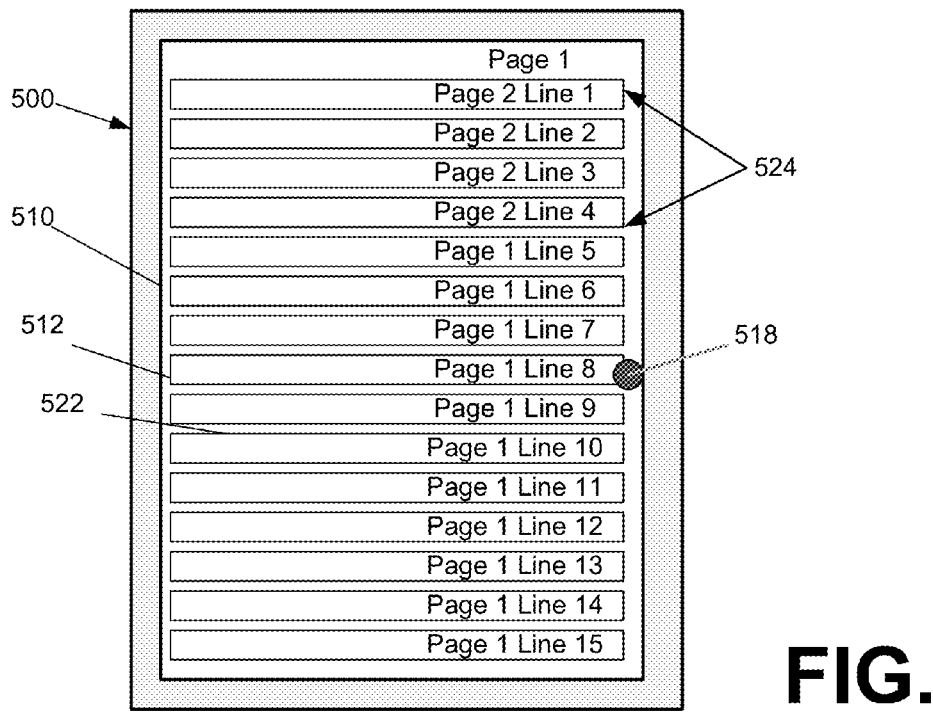

In FIG. 5B, the point of progression 518 is tracked to a mid-point of the page. Select character lines 524 on the current page are identified and replaced with corresponding character lines from the next page. In the example provided, the character lines are identified by line numbers. Character lines of the current page 512 can be replaced with corresponding character lines (as determined from the line numbers) from the next page.

Figure 5C:
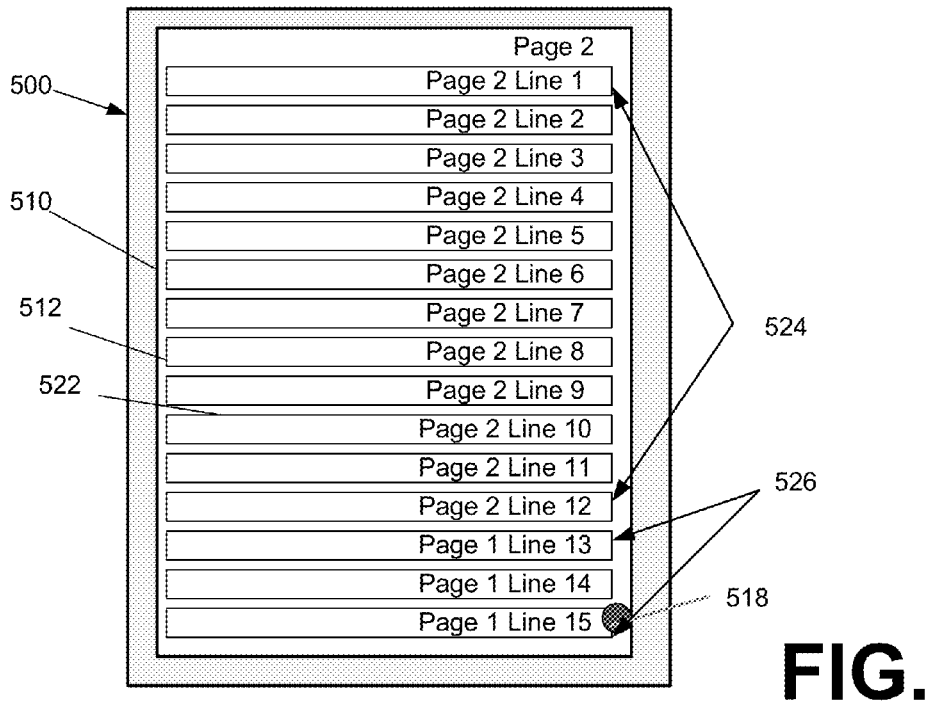

FIG. 5C illustrates the point of progression 518 tracked to the bottom of the page. In the example provided, at the bottom of the page, the character lines 524 which have been replaced with corresponding character lines of the next page can correspond to a majority.

Figure 5D:
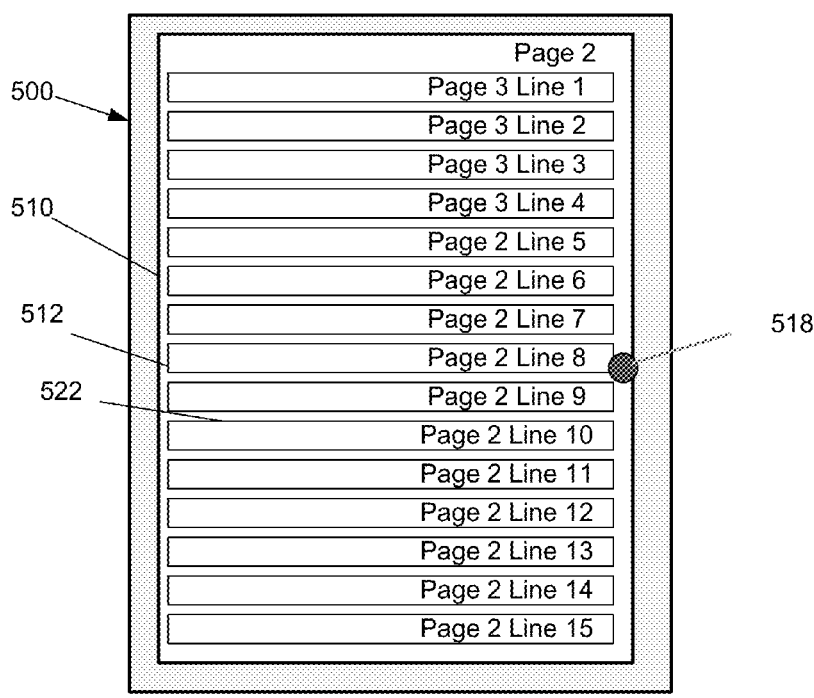

As shown by an example of FIG. 5D, when the user reaches the bottom of the page, the user can start reading from the top of the page without signaling a page transition. As the point of progression 518 moves downward, the first set of lines 524 can be identified and replaced. Rather, the lines from the top of the page 512 render character lines from the next page, which can now be viewed as the current page. The bottom set of lines 526 from the current page can also be replaced with corresponding character lines of the next page, so that the transition to the next page is complete.

Many described examples, including an example of FIG. 5A through FIG. 5D, can provide significant benefits to speed readers who utilize e-reading devices. In particular, speed reading on e-reading devices 110 such as those which provide EPD devices can reduce or eliminate the user's perception of visual disruptions which can result from, for example, a global page update or refresh operation. With speed reading in particular, the user's page transition can cause a noticeable flicker which can impede the user's reading ability. In contrast to conventional approaches, the described embodiments utilize progressive page transitions which replace lines 524 of text above or otherwise away from the user's gaze. Should any visual disruption arise (e.g., screen flicker), such disruption would occur away from the user's gaze and perception.

Although illustrative embodiments have been described in detail herein with reference to the accompanying drawings, variations to specific embodiments and details are encompassed by this disclosure. It is intended that the scope of embodiments described herein be defined by claims and their equivalents. Furthermore, it is contemplated that a particular feature described, either individually or as part of an embodiment, can be combined with other individually described features, or parts of other embodiments. Thus, absence of describing combinations should not preclude the inventor(s) from claiming rights to such combinations.

What is claimed is:

1. A computing device comprising:
   a housing;
   a display assembly including a display screen provided with the housing;
   a set of one or more sensors that are arranged to detect user activity;
   a processor that operates to:
      render individual pages of an e-book, each page including multiple lines of characters that are arranged, based at least in part on a language origin of the e-book, to have a direction of progression, the pages of the e-book being sequenced;
      when rendering a current page from the e-book, detect, using the set of sensors, a user activity in the direction of progression;
      at each of multiple instances during when the user's activity is detected, correlate a position determined from the activity with a set of character lines of the current page indicating a position of progression; and
      during when the user's activity is detected on the current page, replace at least one of the multiple lines of characters on the current page with a set of character lines from a next page that follows the current page in the sequence, the at least one of the multiple lines of characters preceding, relative to the direction of progression, the set of character lines that indicate the position of progression.

2. The computing device of claim 1, wherein the set of one or more sensors includes one or more sensors that are provided with a surface of at least one of the display screen or processor to detect user activity corresponding to the user moving an object on the surface.

3. The computing device of claim 2, wherein the set of sensors are integrated with the display assembly, and wherein the surface corresponds to at least a portion of the display screen.

4. The computing device of claim 2, wherein the set of sensors are integrated with the housing, and wherein the surface corresponds to at least a portion of the housing.

5. The computing device of claim 1, wherein the set of one or more sensors includes an image sensor that is directed to capture image data of the user viewing the display screen, and wherein the processor operates to detect user activity corresponding to the user moving his or her gaze in the direction of progression while viewing the display screen.

6. The computing device of claim 1, wherein the e-book includes a horizontally aligned script, and the processor renders each page to include multiple lines of characters that are horizontally aligned, and wherein the processor detects activity that indicates a vertical direction of progression for the horizontally aligned script.

7. The computing device of claim 1, wherein the e-book includes a vertically aligned script, and the processor renders each page to include multiple lines of characters that are vertically aligned, and wherein the processor detects activity that indicates a horizontal direction of progression for the vertically aligned script.

8. The computing device of 1, wherein the display assembly is an electronic paper type display.

9. The computing device of 1, wherein the display assembly is a liquid crystal display.

10. The computing device of claim 1, wherein the processor replaces at least one of the multiple lines of characters on the current page when the current position exceed a predetermined threshold of progression for the current position.

11. The computing device of claim 1, wherein the processor replaces at least one of the multiple lines of characters on the current page by (i) replacing a first set of one or more lines or characters with a corresponding set of character lines from the next page when the position determined from the activity indicates a first point of progression on the current page; and (ii) replacing a second set of one or more lines or characters with a corresponding set of character lines from the next page when the position determined from the activity indicates a second point of progression on the current page.

12. A method for operating a computing device to render an e-book, the method being implemented by one or more processors of the computing device and comprising:
   (a) tracking a reader's position of progression on a current page of an e-book, the e-book including a collection of pages, each page of the collection including multiple lines of characters that are arranged, based at least in part on a language origin of the e-book, to have a direction of progression, the pages of the e-book being arranged in a sequence;
   (b) progressively transitioning the current page to a next page of the sequence based on the reader's position on the current page at least by replacing one or more lines of characters on the current page which precede a line of characters that are indicated by a reader's position of progression at a particular instance, with a set of character lines from a next page that follows the current page in the sequence.

13. The method of claim 12, wherein (a) includes tracking a reader activity corresponding to one of (i) the reader's movement of an object or (ii) the reader's gaze, in the direction of progression while rendering the current page.

14. The method of claim 13, wherein the e-book is comprised of horizontally aligned script, and wherein (a) includes detecting activity that is directed in a vertical direction.

15. The method of claim 13, wherein the e-book is comprised of vertically aligned script, and wherein (a) includes detecting activity that is directed in a horizontal direction.

16. The method of claim 12, wherein (b) includes replacing one or more lines of characters on the current page when the reader's position of progression is detected to exceed a predetermined threshold.

17. The method of claim 12, wherein (b) includes replacing a portion of the current page with a portion of the next page of the sequence in response to detecting the position of progression on the current page exceeding a designated threshold.

18. The method of claim 17, further comprising performing (a) and (b) without performing a global page refresh.

19. A non-transitory computer-readable medium for use with one or more processors of a computing device, the non-transitory computer-readable medium storing instructions that, when executed by one or more processors of the computing device, cause the computing device to perform operations comprising:
- (a) determining a reader's current position of progression on a current page of an e-book, the e-book including a collection of pages, each page of the collection including multiple lines of characters that are arranged, based at least in part on a language origin of the e-book, to have a direction of progression, the pages of the e-book being sequenced;
- (b) replacing one or more lines of characters on the current page which precede a line of characters that are indicated by the reader's current position of progression with a set of character lines from a next page that follows the current page in the sequence.

\* \* \* \* \*